(12) United States Patent
Sorensen et al.

(10) Patent No.: US 9,591,123 B2
(45) Date of Patent: Mar. 7, 2017

(54) ECHO CANCELLATION

(71) Applicant: Microsoft Technology Licensing, LLC, Redmond, WA (US)

(72) Inventors: Karsten Vandborg Sorensen, Stockholm (SE); Per Ahgren, Knivsta (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 226 days.

(21) Appl. No.: 14/173,622

(22) Filed: Feb. 5, 2014

(65) Prior Publication Data

US 2014/0355752 A1 Dec. 4, 2014

(30) Foreign Application Priority Data

May 31, 2013 (GB) .................................. 1309781.1

(51) Int. Cl.
*H04M 3/00* (2006.01)
*H04M 9/08* (2006.01)

(52) U.S. Cl.
CPC ........... *H04M 3/002* (2013.01); *H04M 9/082* (2013.01)

(58) Field of Classification Search
None
See application file for complete search history.

(56) References Cited

U.S. PATENT DOCUMENTS

| | | | |
|---|---|---|---|
| 6,125,179 A | 9/2000 | Wu | |
| 6,282,286 B1 | 8/2001 | Reesor et al. | |
| 6,317,419 B1 | 11/2001 | Olafsson et al. | |
| 6,961,422 B2 | 11/2005 | Boland | |
| 8,081,753 B2 | 12/2011 | Mohammad et al. | |
| 8,155,302 B2 | 4/2012 | Roovers | |
| 8,275,120 B2 | 9/2012 | Stokes, III et al. | |
| 8,325,909 B2 | 12/2012 | Tashev et al. | |

(Continued)

FOREIGN PATENT DOCUMENTS

JP 2004274681 9/2004

OTHER PUBLICATIONS

"International Search Report & Written Opinion for PCT Patent Application No. PCT/US2014/039649", Mailed Date: Sep. 2, 2014, 9 Pages.
"International Search Report and Written Opinion", Application No. PCT/US2015/044544, Nov. 2, 2015, 11 Pages.
"Managing multiple audio streams in a single room", IP.com Journal, I P. Com Inc. , West Henri Etta, NY, US ISSN: 1533-0001, Nov. 21, 2011, 4 Pages.

(Continued)

*Primary Examiner* — Fan Tsang
*Assistant Examiner* — Jeffrey Lytle
(74) *Attorney, Agent, or Firm* — Tom Wong; Micky Minhas (57) ABSTRACT

A method of echo cancellation in an acoustic system, comprising a first user device and at least one further user device, the method comprising, at the first user device: detecting an audio signal received from the at least one further user device over a communications network; supplying the audio signal when received to an audio signal processing module of the first user device, wherein the audio signal processing module processes the audio signal and outputs a processed audio signal to audio output means of the first user device; and controlling an echo cancellation process for cancelling echo from an audio signal received via audio input means of the first user device based on a loopback signal provided by the processed audio signal and selectively based on the received audio signal when detected.

20 Claims, 4 Drawing Sheets

(56) References Cited

U.S. PATENT DOCUMENTS

| | | | |
|---|---|---|---|
| 8,526,587 B2 | 9/2013 | Uhler et al. | |
| 2002/0076037 A1* | 6/2002 | Nishimura | H04M 9/082 379/406.01 |
| 2003/0039353 A1 | 2/2003 | Matsuo | |
| 2005/0008143 A1 | 1/2005 | Lang et al. | |
| 2006/0140392 A1 | 6/2006 | Ahmadi | |
| 2007/0021958 A1 | 1/2007 | Visser et al. | |
| 2007/0124526 A1* | 5/2007 | Sinai | G06F 13/4022 710/306 |
| 2007/0263851 A1* | 11/2007 | Sukkar | H04B 3/23 379/406.01 |
| 2007/0291918 A1 | 12/2007 | Diethorn | |
| 2008/0267420 A1 | 10/2008 | Fozunbal | |
| 2009/0003586 A1* | 1/2009 | Lai | H04M 9/082 379/406.01 |
| 2009/0185515 A1* | 7/2009 | Sorensen | H04M 9/085 370/310 |
| 2012/0099732 A1 | 4/2012 | Visser | |
| 2012/0243676 A1 | 9/2012 | Beaucoup et al. | |
| 2013/0003960 A1* | 1/2013 | Sollenberger | H04M 9/082 379/406.01 |
| 2013/0039504 A1 | 2/2013 | Pandey et al. | |
| 2013/0163748 A1* | 6/2013 | Khanduri | H04M 9/082 379/406.08 |
| 2013/0322639 A1 | 12/2013 | Cleve | |
| 2014/0009564 A1 | 1/2014 | Cleve et al. | |
| 2015/0201087 A1 | 7/2015 | Volcker | |
| 2016/0050491 A1 | 2/2016 | Ahgren et al. | |

OTHER PUBLICATIONS

"International Preliminary Report on Patentability", Application No. PCT/US2014/039469, Sep. 9, 2015, 6 pages.

"Loopback Recording (Windows)", Retrieved from: <http://msdn.microsoft.com/en-us/library/windows/desktop/dd316551(v=vs.85).aspx> Mar. 4, 2013, Nov. 12, 2012, 3 Pages.

"How to Choose an Acoustic Echo Canceller", Available at: <http://support.polycom.com/global/documents/support/technical/products/voice/vortex_choose_acoustic_echo_canceller.pdf>, Sep. 2004, 13 pages.

"Second Written Opinion", Application No. PCT/US2014/039649, May 6, 2015, 4 pages.

"The Importance of Acoustic Echo Cancellation for Audio Conferencing", Available at: <http://www.avispl.com/wp-content/uploads/2012/12/The-Importance-of-Acoustic-Echo-Cancellation-for-Audio-Conferencing1.pdf>, Jan. 30, 2013, 1 page.

Stimpson, "The Importance of Acoustic Echo Cancellation—Part 1", Retrieved From: <http://www.biamp.com/blog/the-importance-of-acoustic-echo-cancellation-part-1/> Jun. 6, 2014, Dec. 13, 2011, 2 pages.

"Non-Final Office Action", U.S. Appl. No. 14/498,972, May 6, 2016, 19 pages.

"Second Written Opinion", Application No. PCT/US2015/044544, Jul. 22, 2016, 5 pages.

"Final Office Action", U.S. Appl. No. 14/498,972, Nov. 10, 2016, 28 pages.

"International Preliminary Report on Patentability", Application No. PCT/US2015/044544, Nov. 09, 2016, 7 pages.

* cited by examiner

ECHO CANCELLATION

RELATED APPLICATIONS

This application claims priority under 35 USC §119 or §365 to Great Britain Patent Application No. 1309781.1 entitled "Echo Cancellation" filed May 31, 2013 by Sorensen et al., the disclosure of which is incorporate in its entirety.

BACKGROUND

Communication systems allow users to communicate with each other over a network. The network may be, for example, the Internet or public switched telephone network (PSTN). Audio signals can be transmitted between nodes of the network, to thereby allow users to transmit and receive audio data (such as speech data) to each other in a communication session over the communication system.

A user device may have audio input means such as a microphone that can be used to receive audio signals such as speech from a user. The user may enter into a communication session with another user, such as a private call (with just two users in the call) or a conference call (with more than two users in the call). The user's speech is received at the microphone, processed and is then transmitted over a network to the other users in the call. The user device may also have audio output means such as speakers for outputting audio signals to nearend user that are received over the network from a farend user during a call. Such speakers can also be used to output audio signals from other applications which are executed at the user device, and which can be picked up by the microphone as unwanted audio signals which would disturb the speech signals from the nearend user.

As well as the audio signals from the user, the microphone may also receive other audio signals, such as background noise, which are unwanted and which may disturb the audio signals received from the user. The background noise can contribute to disturbance to the audio signal received at the microphone from the nearend user for transmission in the call to a farend user. A further cause of interference to the nearend user signal can arise from other audio signals played out through the same speakers, such as music or audio from an application on the user device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of echo cancellation in an acoustic system. A first user device is in communication with another user device. At the first user device an audio signal received from the other user device over a communications network is detected. The audio signal when received is supplied to an audio signal processing module of the first user device. The audio signal processing module processes the audio signal and outputs a processed audio signal to a loudspeaker or similar of the first user device. An echo cancellation process for cancelling echo from an audio signal received via a microphone or similar of the first user device is controlled based on a loopback signal provided by the processed audio signal and selectively based on the received audio signal when detected.

The method may be used in a call (e.g. a call implementing voice over internet protocol (VoIP) to transmit audio data between user devices) in which case the audio signal may be a far-end signal received from the far-end of the call, and the received signal includes the resulting echo and a near-end signal for transmission to the far-end of the call.

BRIEF DESCRIPTION OF THE DRAWINGS

For a better understanding of the described embodiments and to show how the same may be put into effect, reference will now be made, by way of example, to the following drawings in which.

DETAILED DESCRIPTION

Embodiments will now be described by way of example only.

In this disclosure related to suppression based acoustic echo cancellers, an over-suppression factor is controlled based on the farend signal, and the echo path is adapted using the loopback signal provided by acoustic interfaces such as the Microsoft WASAPI. More specifically, the over-suppression factor is set to a very low value, for example zero, while no activity is detected in the farend signal. During this time, the echo canceller will apply no suppression. As soon as activity is detected in the farend signal the over-suppression factor is increased to a higher value, which can enable the echo canceller to apply suppression. While this will ensure that no fading happens when the farend speaker is inactive, independent algorithms are used on the loopback signal and the echo path estimate is updated in the echo canceller while there is sufficient signal power to get a reliable update.

Figure 1:
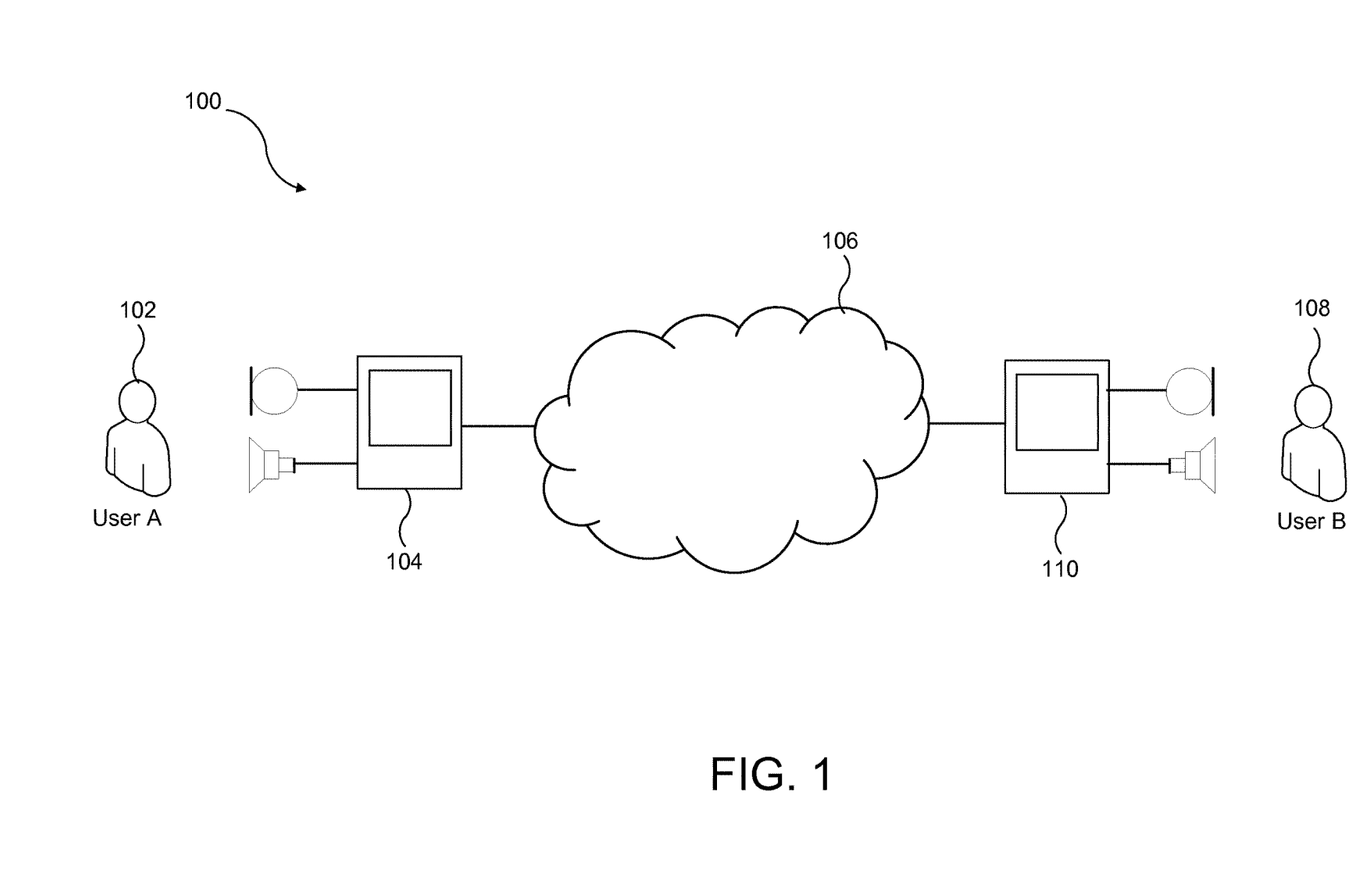
FIG. 1 shows a schematic illustration of a communication system.

FIG. 1 shows a communication system 100 comprising a first user 102 ("User A") who is associated with a first user device 104 and a second user 108 ("User B") who is associated with a second user device 110. In other embodiments the communication system 100 may comprise any number of users and associated user devices. The user devices 104 and 110 can communicate over the network 106 in the communication system 100, thereby allowing the users 102 and 108 to communicate with each other over the network 106. The communication system 100 shown in FIG. 1 is a packet-based communication system, but other types of communication system could be used. The network 106 may, for example, be the Internet. Each of the user devices 104 and 110 may be, for example, a mobile phone, a tablet, a laptop, a personal computer ("PC") (including, for example, Windows™, Mac OS™ and Linux™ PCs), a gaming device, a television, a personal digital assistant ("PDA") or other embedded device able to connect to the network 106. The user device 104 is arranged to receive information from and output information to the user 108 of the user device 110. The user device 104 comprises output means such as a display and speakers. The user device 104 also comprises input means such as a keypad, a touchscreen, a microphone for receiving audio signals and/or a camera for capturing images of a video signal. The user device 104 is connected to the network 106.

The user device 104 executes an instance of a communication client, provided by a software provider associated with the communication system 100. The communication client is a software program executed on a local processor in the user device 104. The client performs the processing required at the user device 104 in order for the user device 104 to transmit and receive data over the communication system 100.

The user device 110 corresponds to the user device 104 and executes, on a local processor, a communication client which corresponds to the communication client executed at the user device 104. The client at the user device 110 performs the processing required to allow the user 108 to communicate over the network 106 in the same way that the client at the user device 104 performs the processing required to allow the user 102 to communicate over the network 106. The user devices 104 and 110 are endpoints in the communication system 100. FIG. 1 shows only two users (102 and 108) and two user devices (104 and 110) for clarity, but many more users and user devices may be included in the communication system 100, and may communicate over the communication system 100 using respective communication clients executed on the respective user devices.

Both the first user device 104 and a second user device 110 may perform acoustic echo cancellation. There are two main ways to achieve acoustic echo cancellation, one being echo subtraction and the other being echo suppression. Often these two approaches are combined.

The audio signal captured by the microphone of the first user device 104 is transmitted over the network 106 for playing out by the second user device 110. The microphone of the second user device 110 captures an echo of the audio signal that was transmitted by the first user device 104, if that echo is not fully cancelled, then the second user device 110 transmits it back to the first user device 104. That received signal is played-out through the speakers of the first user device 104 and, an echo is captured by the microphone of the first user device 104. If the echo canceller in the first user device 104 is not able to completely remove that echo, the echo signal is transmitted again to the second user device 110.

Devices typically have a dedicated audio signal processing module (such as a sound card) in addition to a local processor on the device. This audio signal processing module performs audio processing functions for the user device such as analogue to digital conversion (ADC) of audio signals captured at a microphone and digital to analogue conversion (DAC) of audio signals for playing out of a speaker. To use the audio signal processing module an operating system (OS) executed on the local processor on the device typically requires specific software. For example, to use a sound card, an OS typically requires a specific sound card driver (a software program that handles the data connections between the physical hardware of the sound card and the operating system).

It is common that this software (i.e. sound card drivers) introduce effects on the play out signal (i.e. the signal to be output from a speaker) in order to maximize the user experience (e.g. loudness enhancement effects included in the drivers). Those effects are achieved by signal processing modules on the audio signal processing module the functionality of which is unknown to the applications (i.e. a communication client) executed on a local processor on the device that use the play out system available in the OS. However, some operating systems include functionality for feeding back the signal that is going to be played out, to the application executed on the local processor. Examples of operating systems including this functionality are Microsoft's Windows 7, 8, XP and Vista Windows Phone 8 operating systems. This signal that is fed back to the application executed on the local processor is referred to herein after as a "loopback signal".

Loudspeaker playout effects such as loudness enhancements, dynamic range compression, noise suppression and more are becoming increasingly popular in consumer products. From an echo cancellation point of view they cause problems as these effects are applied in the echo path as seen by the echo canceller, thereby causing the echo path to be highly time-varying. For this reason the loopback signal is often provided for e.g. echo cancellers to use as reference signal. The loopback signal contains the effects of all nonlinear and time-varying loudspeaker preprocessing. Furthermore, it also typically includes music or other sounds from other applications that is being played out by the loudspeaker. Thus the loopback signal is a good acoustic echo cancellation reference signal in all aspects for subtraction based echo cancellers. However, for suppression based echo cancellers relying on activity detectors on the far-end signal, any additional activity in the loopback signal can pose a severe problem.

The problem that is caused by the added activity is fading which causes the echo canceller to suppress the near-end speech in the effort of suppressing the loudspeaker echoes in the microphone signal.

There are primarily two types of problems with using the loopback signal for echo suppression: 1) fading caused by music and sounds played out from other applications, and 2) fading caused by increased voice activated detection activity due to the loudspeaker preprocessing.

In the former, the effect of having music in the loopback signal is often excessive fading of the nearend speech signal, while the nearend speaker is active during the music playout. A good choice in this case is to let the acoustic echo canceller only suppress speech originating from the far-end signal and not any music. This is accomplished using the techniques described below.

In the second, the loudspeaker preprocessing present in the signal often transforms the farend signal into a signal with less ideal properties. Examples of this are that the signal-to-noise ratio is decreased, and the stationary background noise level may become time-variant. This causes problems for echo cancellers that are relying on activity detectors since this kind of processing makes these less reliable. It facilitates signal processing to apply the activity detectors on the farend signal rather than on the loopback signal. This is accomplished using the techniques described below.

In this disclosure, an echo over-suppression factor is controlled based on the farend signal, but the echo path estimate using the loopback signal is adapted, in contrast to using both on either the farend or the loopback signals. More specifically, the over-suppression factor is set to a very low value, e.g., zero, while no activity is detected in the farend signal. During this time, the echo canceller will apply no suppression. As soon as activity is detected in the farend signal the over-suppression factor is increased to a higher value, e.g., one, which enables the echo canceller to apply suppression. While this will ensure that no fading happens when farend speaker is inactive, the independent control functionality is still used so that the echo path estimate of the echo canceller that is updated on the loopback signal is only updated while there is sufficient signal power to get a reliable update.

Figure 2:
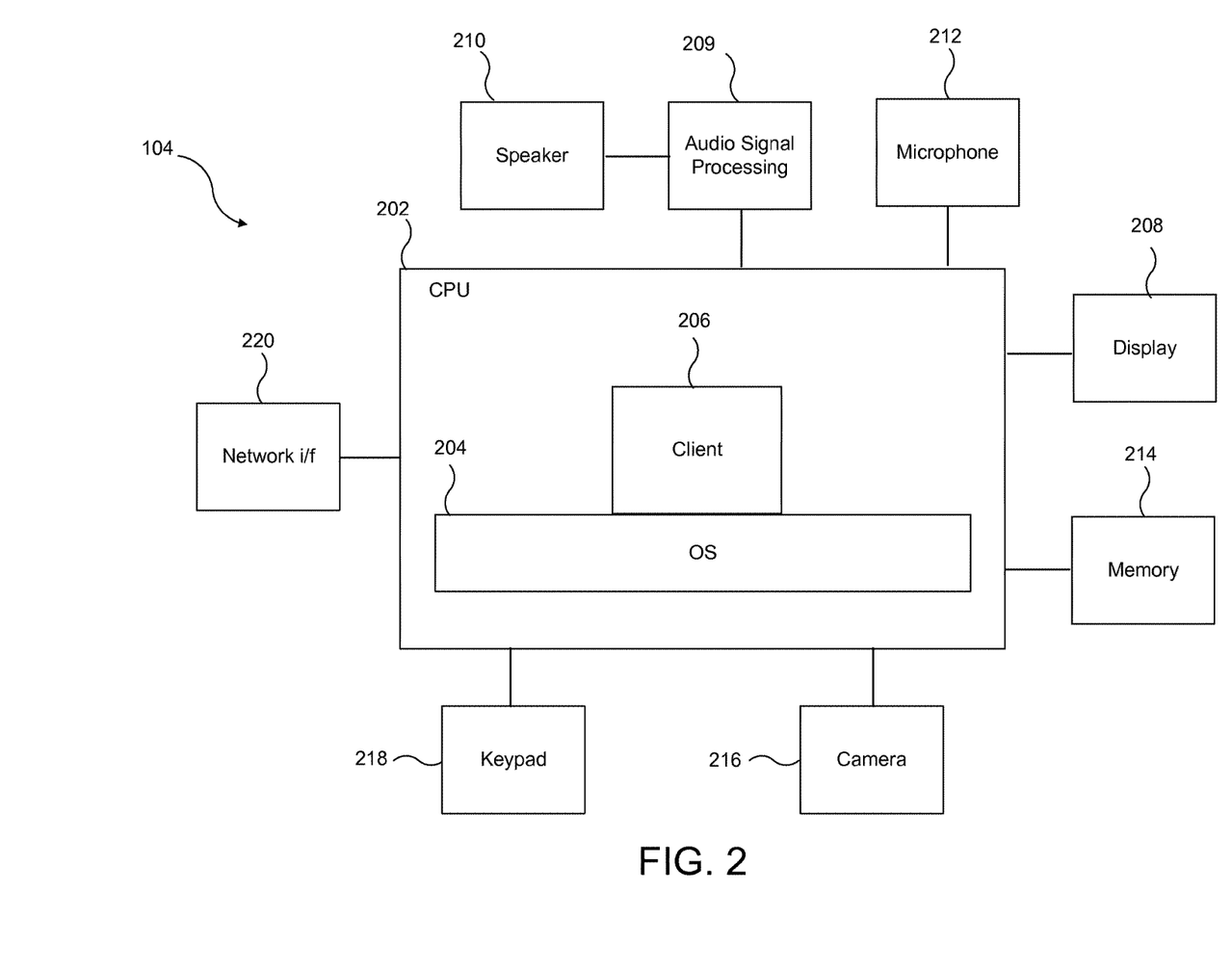
FIG. 2 is a schematic block diagram of a user device.

FIG. 2 illustrates a detailed view of the user device 104 on which is executed a communication client instance 206 for communicating over the communication system 100. The user device 104 comprises a central processing unit ("CPU") or "processing module" 202, to which is connected: output devices such as a display 208, which may be implemented as a touch-screen, and a speaker (or "loudspeaker") 210 for outputting audio signals; input devices such as a microphone 212 for receiving audio signals, a camera 216 for receiving image data, and a keypad 218; a memory 214 for storing data; and a network interface 220 such as a modem for communication with the network 106. The user device 104 may comprise other elements than those shown in FIG. 2. The display 208, speaker 210, microphone 212, memory 214, camera 216, keypad 218 and network interface 220 may be integrated into the user device 104 as shown in FIG. 2. In alternative user devices one or more of the display 208, speaker 210, microphone 212, memory 214, camera 216, keypad 218 and network interface 220 may not be integrated into the user device 104 and may be connected to the CPU 202 via respective interfaces. One example of such an interface is a USB interface. If the connection of the user device 104 to the network 106 via the network interface 220 is a wireless connection then the network interface 220 may include an antenna for wirelessly transmitting signals to the network 106 and wirelessly receiving signals from the network 106.

FIG. 2 also illustrates an operating system ("OS") 204 executed on the CPU 202. Running on top of the OS 204 is the software of the client instance 206 of the communication system 100. The operating system 204 manages the hardware resources of the computer and handles data being transmitted to and from the network 106 via the network interface 220. The client 206 communicates with the operating system 204 and manages the connections over the communication system. The client 206 has a client user interface which is used to present information to the user 102 and to receive information from the user 102. In this way, the client 206 performs the processing required to allow the user 102 to communicate over the communication system 100.

Figure 3:
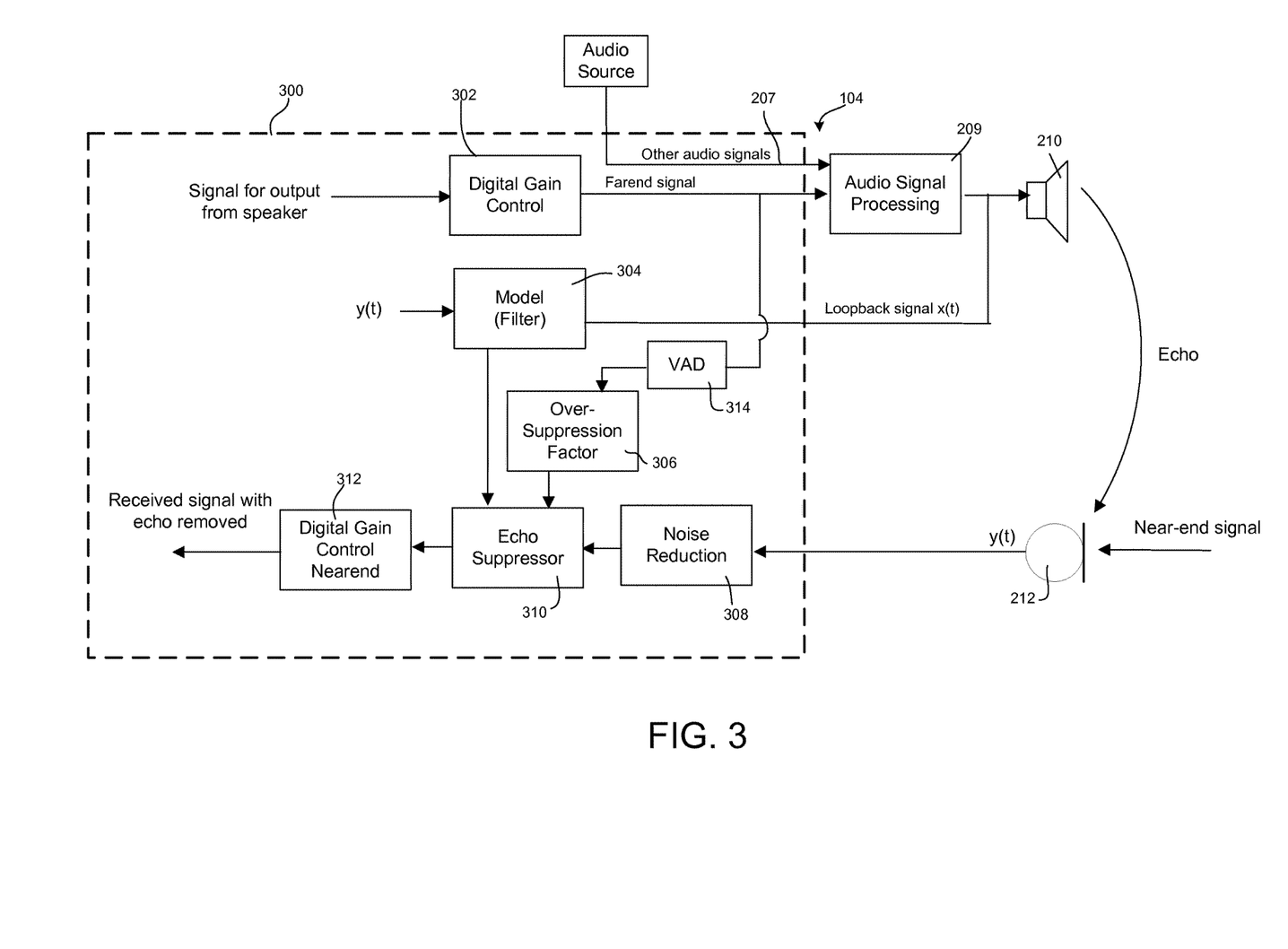
FIG. 3 is a schematic function diagram of an echo cancellation technique.
Figure 4:
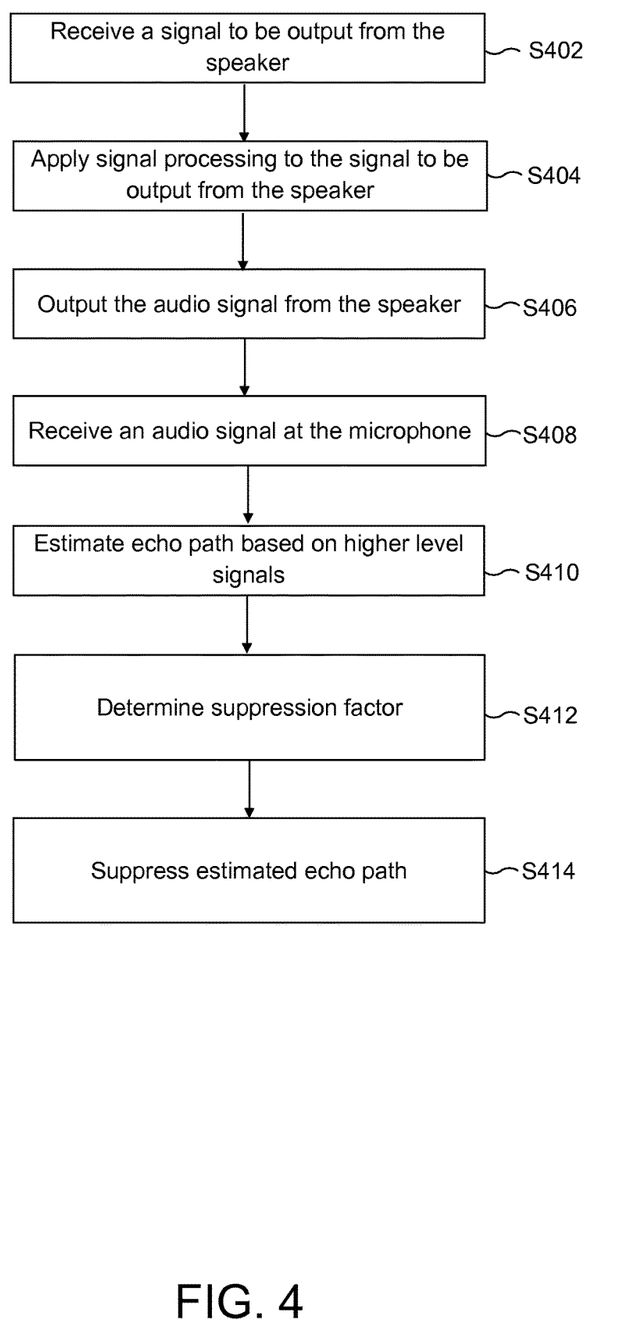
FIG. 4 is a flow chart for a process of echo cancellation.

With reference to FIGS. 3 and 4, there is now described a method of echo cancellation. FIG. 3 is a functional diagram of a part of the user device 104.

As shown in FIG. 3, the user device 104 comprises the speaker 210, the microphone 212, and a signal processing module 300. The signal processing module 300 (shown as the dashed box in FIG. 3) represents the signal processing functionality implemented by executing communication client application 206 on the CPU 202 of device 104. The signal processing module 300 may comprise digital gain modules module 302/312, a modelling module 304 comprising a filter module, an over-suppression factor estimation module 306, a noise reduction module 308, an echo suppression module 310 and a voice activity detection module 314. The signal processing functionality implemented by executing communication client application 206 may include more, or less functionality, than that shown in FIG. 3. The user device 104 further comprises an audio signal processing module 209.

To model the echo path gains and estimate the echo captured by a microphone, reference signals are needed. With reference to FIG. 3 (where the OS includes functionality for feeding back the signal that is going to be played out, to a communication client executed on the user device) the techniques described herein use two signals as reference signals.

The first signal that is used as a reference signal is the signal labelled as "far-end signal". This signal represents the audio signal that a communication client sends for playing out from a speaker. Using the far-end signal as a reference has the advantage that any processing performed by the audio signal processing module is taken into account when the echo path is estimated. However, as the processing that is implemented by the audio signal processing module is often highly nonlinear and signal dependent it can be difficult to get good estimates for the echo paths that are valid.

The second signal that can be considered a reference signal is the signal labelled as "loopback signal". As described above, this is the signal that the OS feedbacks to the communication client and that has been affected by the processing that the audio signal processing module applies to the signal before playing it out from a speaker. Using the loopback signal as the reference signal avoids the problem of forcing the echo path estimation to attempt estimating the processing done by the audio signal processing module. This signal has often been modified in a nonlinear manner such that low-level (i.e. low amplitude) signals are boosted more than high-level (i.e. high amplitude) signals, making it extremely difficult to use this signal for estimating the system gain. Furthermore, it may include other signals, such as music 207, being played out by the device.

FIG. 4 is a flow chart for the process.

A signal to be output from the speaker 210 is coupled to an input of the digital gain module 302. An output of the digital gain module 302 (denoted "far-end signal") is coupled to an input of the audio signal processing module 209. An output of the audio signal processing module 209 is coupled to the speaker 210. It should be noted that in the embodiments described herein there is just one speaker (indicated by reference numeral 210 in the figures) but in other embodiments there may be more than one speaker to which the signal to be outputted is coupled (for outputting therefrom). Similarly, in the embodiments described herein there is just one microphone (indicated by reference numeral 212 in the figures) but in other embodiments there may be more than one microphone which receives audio signals from the surrounding environment. The output of the audio signal processing module 209 is also coupled to a first input of the modelling module 304. An output of the microphone 212 is coupled to the signal processing module 300. In particular, the output of the microphone 212 is coupled to an input of the noise reduction module 308. The output of the microphone 212 is also coupled to a second input of the modelling module 304. An output of the modelling module 304 is coupled to a first input of the echo suppression module 310. An output of the noise reduction module 308 is coupled to a second input of the echo suppression module 310. An output of the echo suppression module 310 is coupled to an input of the gain control module 312. An output of the gain control module 312 is used to provide the received signal (with echo cancellation having been applied) for further processing in the user device 104.

In step S402 a signal is received which is to be outputted from the speaker 210. For example, the signal to be outputted may be a far-end signal that has been received at the user device 104 at network interface 220 from the user device 110 during a call between the users 102 and 108 over the communication system 100. In other embodiments, the signal to be outputted may be received from somewhere other than over the communication system 100 in a call. For example, the signal to be outputted may have been stored in the memory 214 and step S402 may comprise retrieving the signal from the memory 214.

Digital gain module 302 may apply a level of gain to the far-end signal before the far-end signal is supplied to audio signal processing module 209.

In step S404, the far-end signal is processed by the audio signal processing module 209. That is, the audio signal processing module 209 performs digital to analogue conversion (DAC) of the far-end signal and processes the far-end signal in accordance with effects introduced by software executed on CPU 204 before outputting the processed audio signal to speaker 210. The processing that is applied by the audio signal processing module 209 may be time variant and may be different for speech regions to noisy regions of the far-end signal. The processing that is implemented by the audio signal processing module 209 may include compression whereby different gains are applied to the far-end signal depending on the input level of the far-end signal.

In step S406 the audio signal that has been processed by the audio signal processing module 209 is outputted from the speaker 210. In this way the audio signal that has been processed by the audio signal processing module 209 is outputted to the user 102.

In step S408 the microphone 212 receives an audio signal. As shown in FIG. 3 the received audio signal may include a near-end signal which is a desired signal or "primary signal". The near-end signal is the signal that the user 102 intends the microphone 212 to receive. However, the received audio signal also includes an echo signal resulting from the audio signals outputted from the speaker 210 in step S406. The received audio signal may also include noise, such as background noise or music 207. Therefore, the total received audio signal y(t) can be given by the sum of the near-end signal, the echo and the noise. The echo and the noise act as interference for the near-end signal. Although not shown in FIG. 3, analogue to digital (ADC) conversion is applied to the signal captured by the microphone 212 to arrive at the digital signal y(t).

The modelling module 304 takes as inputs the outputted audio signal (denoted "loopback signal") and the received audio signal y(t). In step S410, the modelling module 304 is used to model the echo path of the echo in the received audio signal y(t).

The echo path describes the effects of the acoustic paths traveled by the audio signals output from the speaker 210 to the microphone 212. The audio signal may travel directly from the speaker 210 to the microphone 212, or it may be reflected from various surfaces in the environment of the nearend terminal. The echo path traversed by the audio signal output from the speaker 210 may be regarded as a system having a frequency and a phase response which may vary over time.

In order to remove the acoustic echo s(t) from the signal y(t) recorded at the near-end microphone 212 it is necessary to estimate how the echo path changes the desired far-end speaker output signal to an undesired echo component in the input signal.

For an approximately linear echo path the echo path h(t) describes how the echo in the received audio signal y(t) relates to the loopback signal x(t) output from the speaker 210, e.g. for a linear echo path represented by the impulse response h(t) according to the equation: $s(t)=\Sigma_{n=0}^{N_{true}} h_n(t)x(t-n)$, where s(t) is the echo in the received audio signal y(t), $N_{true}$ is the number of samples of the outputted loopback signal x(t) which are received by the microphone 212 and $h_n(t)$ are the coefficients of the impulse response describing the echo path h(t). The echo path h(t) may vary in both time and frequency and may be referred to herein as h(t) or h(t,f). The echo path h(t) may depend upon (i) the current environmental conditions surrounding the speaker 210 and the microphone 212 (e.g. whether there are any physical obstructions to the passage of the audio signal from the speaker 210 to the microphone 212, the air pressure, temperature, wind, etc), and (ii) characteristics of the speaker 210 and/or the microphone 212 which may alter the signal as it is outputted and/or received, and (iii) any other process of the signal that might not be reflected in the loopback signal, e.g., buffer delays.

The filter module 304 models the echo path h(t) associated with the echo in the received audio signal y(t) by determining a weighted sum of the current and a finite number (N) of previous values of the outputted loopback signal x(t). The filter module 304 therefore implements an Nth order filter which has a finite length (in time) over which it considers the values of the outputted loopback signal x(t) in determining the estimate of the echo path $\hat{h}(t)$. In this way, the filter module 304 dynamically adapts the filter estimate of the echo path $\hat{h}(t)$. The operation is described by the following equation, which defines the echo in the received audio signal y(t) in terms of the outputted loopback signal x(t): $\hat{s}_1(t)=\Sigma_{n=0}^{N} \hat{h}_n(t)x(t-n)$. Therefore N+1 samples of the outputted loopback signal x(t) are used, with a respective N+1 weights $\hat{h}_n(t)$. The set of N+1 weights $\hat{h}_n(t)$ is referred to herein simply as the estimate of the echo path $\hat{h}(t)$. In other words the estimate of the echo path $\hat{h}(t)$ is a vector having N+1 values where the filter module 304 implements an Nth order filter, taking N+1 values (e.g. N+1 frames) of the outputted loopback signal x(t) into account.

It can be appreciated that it is easier to adapt the filter estimate of the echo path $\hat{h}(t)$ when the echo is a dominant part of the received audio signal, that is when y(t)≈s(t). However, it may be possible to adapt the filter estimate of the echo path $\hat{h}(t)$ even when the echo is not a dominant part of the received audio signal y(t) if the echo s(t) is independent of the other signal components of y(t).

It will be appreciated by one skilled in the art that the estimate of the echo path $\hat{h}(t)$ does not need to be explicitly calculated, but could be represented by means of filter coefficients obtained from stochastic gradient algorithms such as Least Mean Squares (LMS), Normalized Least Mean Squares (NLMS), Fast Affine Projection (FAP) and Recursive Least Squares (RLS).

The estimate of the echo path $\hat{h}(t)$ is used to provide filter coefficients that filter the loopback signal to generate an estimate $\hat{s}_1(t)$ of the echo component in the near end signal y(t) in accordance with the estimate of the echo path $\hat{h}(t)$. Regardless of the particular algorithm used, the filter coefficients of the filter module 304 are updated with each iteration of the algorithm, thus the coefficients of the filter module 304 are continually updated over time regardless of the signal conditions at hand.

Whilst the above description refers to the use of a time domain FIR model of the echo path to estimate the echo component in the near end signal y(t) it will be appreciated by those skilled in the art that this is just an example and not limiting in any way. That is, the filter module 304 may operate to determine an estimate of the echo path $\hat{h}(t)$ and thus an estimate $\hat{s}_1(t)$ of the echo component in the near end signal y(t) in the time domain or in the frequency domain.

Estimation of the echo path is typically based on high energy signals as those are the signals that produce the most reliable echo path estimates.

The over-suppression factor estimation module 306 receives an output from the voice activity detector 314. In step S412 the estimation module 306 determines a suppression factor based on whether the farend signal is detected or not, or on the detected level of the farend signal, as previously described.

Signal processing may be performed on a per frame basis. As there might be a delay between farend and loopback signal this additional delay needs to be estimated for it to be possible to match the over suppression factor (based on the farend signal) to the corresponding loopback frame.

The noise reduction module 308 is arranged to lower the noise level of the microphone signal y(t) without affecting the speech signal quality of the microphone signal y(t). Various noise reduction techniques are known to persons skilled in the art for the purpose of eliminating noise. Spectral subtraction is one of these methods to enhance speech in the presence of noise. Spectral subtraction, uses estimates of the noise spectrum and the noisy speech spectrum to form a signal-to-noise (SNR) based gain function which is multiplied with the input spectrum to suppress frequencies having a low SNR. The aim of this process is to obtain an audio signal which contains less noise than the original.

A filter module in the modelling module 304 filters the loopback signal x(t) to generate an estimate of the echo component in the near end signal y(t) in accordance with the estimate of the echo path.

The echo suppression module 310 is arranged apply echo suppression to the high level portions of the received audio signal y(t). The purpose of the echo suppressor 310 is to suppress the loudspeaker echo present in the microphone signal, e.g. in a VoIP client, to a level sufficiently low for it not to be noticeable/disturbing in the presence of the near-end sounds (non-echo sounds) picked up by the microphone 212. Echo suppression methods are known in the art. Furthermore, the echo suppression method applied by the echo suppression module 310 may be implemented in different ways. As such, the exact details of the echo suppression method are therefore not described in detail herein.

The echo suppression module 310 is arranged to receive as input the estimate of the echo component in the near end signal y(t) and the microphone signal y(t) following noise reduction implemented by noise reduction module 308. The echo suppression module 310 is arranged to determine the power of the estimated echo and the power of the microphone signal y(t)) following noise reduction. In the echo suppression module 310 the estimated echo power is used together with the determined power of the microphone signal y(t), and the output of the over-suppression factor estimation module 306 to form echo suppression gains G(t,f) for time t and frequency f. The echo suppression gain has the purpose of suppressing (S414) any echo s(t) in the microphone signal y(t) to such a level that they are not noticeable in the presence of the near-end signal in the microphone input.

The voice activity detection 314 controls the level of the echo suppression gain to be a low level or zero when there is no farend signal detected and a high level or one when the farend signal is detected with sufficient power.

The echo suppression module 310 outputs the received signal, with the echo having been suppressed, for further processing at the digital gain control module 312.

The signal output from the digital gain control module 312 may be processed by the client 206 (e.g. encoded and packetized) and then transmitted over the network 106 to the user device 110 in a call between the users 102 and 108. Additionally or alternatively, the signal output from the digital gain control module 312 may be used for other purposes by the user device 104, e.g. the signal may be stored in the memory 214 or used as an input to an application which is executing at the user device 104.

In the embodiments described above, the echo removal is implemented in a VoIP system (e.g. the received audio signal may include speech of the user 102 for transmission to the user device 110 during a call between the users 102 and 108 over the communication system 100). However, the methods described herein can be applied in any suitable system in which echo cancellation is to be applied.

This disclosure considers a situation such as, for example, playing music on a user terminal at the same time as having a VoIP call, while having enabled loudness enhancements in the sound card driver. The following cases are discussed for comparison:

While a farend user is actively speaking (farend signal activity detected):
a. No loopback is used: The farend user will hear echo residuals, music residuals, and only nearend residuals.
b. Loopback is used: The farend user will hear no echo residuals, no music, but problems will arise with hearing what nearend is saying due to cancellation of the constantly active music.

While farend use is NOT actively speaking (no or low farend signal activity detected):
a. No loopback is used: The farend user will hear music and will hear nearend fine.
b. Loopback is used without the current technique: The farend speaker will hear no music, and will have problems hearing what nearend is saying due to cancellation of the constantly active music.
c. Loopback with the current technique: The farend user will hear music, nearend can be heard.

In the embodiments described above, the acoustic system 100 comprises just two user devices. However it will be appreciated that the methods described herein can be applied in acoustic systems comprising more than two user devices.

The methods described herein may be implemented by executing a computer program product (e.g. the client 206) at the user device 104. That is, a computer program product may be configured to reduce noise in an acoustic system comprising the user device 104 and at least one further user device wherein the computer program product is embodied on a computer-readable storage medium (e.g. stored in the memory 214) and configured so as when executed on the CPU 202 of the device 104 to perform the operations of any of the methods described herein.

Generally, any of the functions described herein (e.g. the functional modules shown in FIG. 3 and the functional steps shown in FIG. 4) can be implemented using software, firmware, hardware (e.g., fixed logic circuitry), or a combination of these implementations. The modules and steps shown separately in FIGS. 3 and 4 may or may not be implemented as separate modules or steps. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices.

The features of the techniques described herein are platform-independent, meaning that the techniques may be implemented on a variety of commercial computing platforms having a variety of processors. For example, the user devices may also include an entity (e.g. software) that causes hardware of the user devices to perform operations, e.g., processors functional blocks, and so on. For example, the user devices may include a computer-readable medium that may be configured to maintain instructions that cause the user devices, and more particularly the operating system and associated hardware of the user devices to perform operations. Thus, the instructions function to configure the operating system and associated hardware to perform the operations and in this way result in transformation of the operating system and associated hardware to perform functions. The instructions may be provided by the computer-readable medium to the user devices through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of echo cancellation in an acoustic system, comprising a first user device and at least one further user device, the method comprising, at the first user device:
   detecting a first audio signal received from the at least one further user device over a communications network;
   supplying the first audio signal when received to an audio signal processing module of the first user device, wherein the audio signal processing module processes the first audio signal and outputs a processed audio signal to audio output means of the first user device;
   controlling an echo cancellation process for cancelling echo from a second audio signal received via audio input means of the first user device based on a loopback signal provided by the processed audio signal and selectively based on the first audio signal when detected, the second audio signal comprising background noise at the first user device;
   responsive to the first audio signal being detected, applying an over-suppression factor for suppressing an estimated echo in the second audio signal in the echo cancellation process by updating an echo path estimate using the loopback signal; and
   responsive to the first audio signal no longer being detected, setting the over-suppression factor to zero in the second audio signal at the first user device such that the background noise is transmitted to the at least one further user device without suppression.

2. A method according to claim 1, wherein the over-suppression factor is zero when no audio signal is detected, and is one when the first audio signal is detected above a threshold.

3. A method according to claim 1, wherein the loopback signal controls a model for providing the estimated echo to be cancelled from the second audio signal received via the audio input means.

4. A method according to claim 3, wherein the over-suppression factor for cancelling the estimated echo is controlled based on the step of detecting the first audio signal received from the at least one further user device.

5. A method according to claim to 1, wherein the step of detecting an audio signal comprises voice activity detection.

6. A method according to claim 1, comprising the step of using the first audio signal when detected for performing signal-to-noise ratio based signal classification in the echo cancellation process.

7. A method according to claim 1, wherein the first audio signal is received in a plurality of frames and wherein a frame of the first audio signal controls the over-suppression factor for the echo cancellation process, wherein a synchronised frame of the loopback signal controls a model of the estimated echo to which the over-suppression factor controlled by the frame of the first audio signal is applied.

8. A method according to claim 1, comprising the step of executing a communication client application on a processing unit at the first user device, the communication client application configured so as when executed to carry out the steps of detecting the first audio signal, supplying the audio signal to the audio signal processing module and controlling the echo cancellation process.

9. A computer device comprising:
   a farend signal detector configured to detect a first audio signal received at the computer device;
   configured to process the audio signal and output a processed audio signal to audio output means of the computer device; and
   an echo canceller configured to cancel echo from a second audio signal received via audio input means of the computer device based on a loopback signal provided by the processed audio signal and selectively based on the first audio signal received at the computer device when detected, the second audio signal comprising background noise at the computer device;
   the echo canceller further configured to:
      responsive to the first audio signal being detected, apply an over-suppression factor for suppressing an estimated echo in the second audio signal in the echo cancellation process by updating an echo path estimate using the loopback signal; and
      responsive to the first audio signal no longer being detected, setting the over-suppression factor to zero in the second audio signal at the computer device such that the background noise is transmitted to another computer device without suppression.

10. A device according to claim 9, further comprising means for controlling the over-suppression factor for suppressing the estimated echo in the echo canceller based on the first audio signal.

11. A device according to claim 10, wherein the over-suppression factor is zero when no audio signal is detected, and is one when the first audio signal is detected above a threshold.

12. A device according to claim 9, wherein the echo canceller is configured to use the loopback signal to control a model for providing the estimated echo to be cancelled from the second audio signal received via the audio input means.

13. A device according to claim 9, wherein the farend signal detector is a voice activity detector.

14. A device according to claim 9, comprising means for controlling the over-suppression factor for cancelling the estimated echo based on the step of detecting the first audio signal received from at least one further user device.

15. A device according to claim 9, wherein the first audio signal is received in a plurality of frames and wherein a frame of the received first audio signal controls the over-suppression factor for cancelling echo from the second audio signal, comprising means for synchronising a frame of the loopback signal to control a model of the estimated echo to which the over-suppression factor controlled by the frame of the received first audio signal is applied.

16. A device according to claim 9, comprising a processing unit configured to execute a communication client application configured so as when executed implement the echo canceller.

17. A device according to claim 9, comprising an audio source for playing out a supplementary audio signal via the audio output means of the computing device.

18. A device according to claim 9, wherein the audio output means comprise a loudspeaker, and the audio input means comprise a microphone.

19. A system comprising:
one or more processors;
a speaker of a first user device configured to output a background noise audio signal; and
a computer-readable storage medium storing a computer program product in the form of a communication client application configured for execution by the one or more processors which, when executed, performs operations comprising:
detecting a farend signal received from a remote user device;
supplying the farend signal to an audio signal processing module configured to output a processed audio signal to the speaker of the first user device;
responsive to the farend signal being detected:
controlling an over-suppression factor for an echo cancellation process based on the step of detecting the farend signal;
using a loopback signal provided by the processed audio signal to control a model for generating an estimated echo in a nearend signal; and
in an echo cancellation process, applying the over-suppression factor to the estimated echo to cancel the estimated echo from the nearend signal by updating an echo path estimate using the loopback signal, and setting the over-suppression factor to zero at the first user device such that the background noise audio signal is transmitted to the remote user device without suppression.

20. A system as recited in claim 19, wherein the step of detecting the farend signal comprises voice activity detection.

* * * * *